US005860095A

United States Patent [19]

Iacobovici et al.

[11] Patent Number: 5,860,095
[45] Date of Patent: Jan. 12, 1999

[54] CONFLICT CACHE HAVING CACHE MISCOUNTERS FOR A COMPUTER MEMORY SYSTEM

[75] Inventors: Sorin Iacobovici; Dean A. Mulla, both of San Jose, Calif.

[73] Assignee: Hewlett-Packard Company, Palo Alto, Calif.

[21] Appl. No.: 582,542

[22] Filed: Jan. 2, 1996

[51] Int. Cl.$^6$ .................................................. G06F 12/12
[52] U.S. Cl. ............................ 711/119; 711/122; 711/460
[58] Field of Search .................................. 395/449, 445, 395/464; 711/118, 119, 122, 128, 129, 133, 137

[56] References Cited

U.S. PATENT DOCUMENTS

| | | | |
|---|---|---|---|
| 5,261,066 | 11/1993 | Jouppi et al. | 395/446 |
| 5,317,718 | 5/1994 | Jouppi | 395/464 |
| 5,386,547 | 1/1995 | Jouppi | 395/425 |
| 5,423,016 | 6/1995 | Tsuchiya et al. | 395/425 |
| 5,465,342 | 11/1995 | Walsh | 395/446 |
| 5,530,958 | 6/1996 | Agarwal et al. | 395/403 |
| 5,577,227 | 11/1996 | Finnell et al. | 395/449 |
| 5,603,004 | 2/1997 | Kurpanek et al. | 395/445 |

OTHER PUBLICATIONS

Kessler et al., "Page Placement Algorithms for Large Real–Indexed Caches," ACM Transactions on Computer Systems, vol. 10, No.4, Nov. 1992, pp. 338–359.
Bershad et al., "Avoiding Conflict Misses Dynamically in Large Direct–Mapped Caches," ACM, pp. 158–170, 1994.
Stiliadis et al., "Selective Victim Caching: A Method to Improve the Performance of Direct–Mapped Caches," IEE, pp. 412–421, 1994.

Jouppi, N.P. "Improving Direct–Mapped Cache Performance by the Addition of a Small Fully–Associative Cache And Prefetch Buffers", Proceeding of the 17th Annual International Symposium On Computer Architecture, May 1990, pp. 364–373.
Kurpanek, G. et al, "PA7200: A PA–RISC Processor With Integrated High Performance MP Bus Interface", Digest of Papers Spring COMPCON 94, 1994, pp. 373–382.

*Primary Examiner*—Eddie P. Chan
*Assistant Examiner*—Gary J. Portka
*Attorney, Agent, or Firm*—Augustus W. Winfield

[57] ABSTRACT

A computer memory cache system that includes hardware (called a conflict cache) for short term tolerance and reduction of cache misses and including counters to enable software to detect and remove longer term cache misses through dynamic page remapping. In an example embodiment, when a conflict miss occurs for a low associativity cache, the address of the displaced item is saved in a content addressable memory and the corresponding data is saved in a data RAM. The operating system logically partitions the low associativity cache into bins, where the address range for a bin is a page or multiple pages. Every logical bin in the low associativity cache has a corresponding counter in the conflict cache. Each bin counter counts the number of conflict misses for the corresponding bin. When a bin counter exceeds a predetermined value, the operating system remaps a corresponding page. For a multiple level cache hierarchy, the top level cache is made a subset of the union of a lower level direct mapped cache and the conflict cache. This inclusion property prolongs the life of cache lines in the top level cache in the presence of conflict misses, improving the top level cache performance. In addition, the top level cache (and the conflict cache) may contain several lines that map to the same index in the lower level cache, thereby reducing the probability of thrashing due to the lower level cache.

6 Claims, 6 Drawing Sheets

CONFLICT CACHE HAVING CACHE MISCOUNTERS FOR A COMPUTER MEMORY SYSTEM

FIELD OF INVENTION

This invention relates generally to digital computer memory systems and more specifically to systems for reducing conflict misses in cache memory systems.

BACKGROUND OF THE INVENTION

Most computer systems employ a multilevel hierarchy of memory systems, with fast but limited capacity memory at the highest level of the hierarchy and proceeding to slower but higher capacity memory at the lowest level of the hierarchy. Typically, the hierarchy includes a small fast memory called a cache, either physically integrated within a processor integrated circuit or mounted physically close to the processor for speed. There may be separate instruction caches and data caches. There may be multiple levels of caches.

A memory hierarchy is useful only if a high percentage of items requested from memory are present in the highest levels of the hierarchy when requested. If a processor requests an item from a cache and the item is present in the cache, the event is called a cache hit. If a processor requests an item from a cache and the item is not present in the cache, the event is called a cache miss. In the event of a cache miss, the requested item is retrieved from a lower level of the memory hierarchy. This may have a significant impact on performance. In general, minimization of cache misses and minimization of the effects of cache misses are some of the most important design parameters for overall computer system performance.

The minimum amount of memory that can be transferred between a cache and a next lower level of the memory hierarchy is called a line, or sometimes a block. Typically, a memory is organized into words (for example, 32 bits per word) and a line is typically multiple words (for example, 16 words per line). Memory may also be divided into pages, with many lines per page.

If a cache stores an entire line address along with the data, any line can be placed anywhere in the cache. A space saving alternative is as follows. Assume that a cache holds 128 lines. For 128 lines, seven bits may be used to designate a line position within the cache. If the least significant seven bits of the line address are used to designate a line within the cache, then only the remaining set of more significant bits of each physical address must be stored along with the data. The number used to designate a line within a cache is commonly called an index and the remaining set of bits required to define a physical address for a line is commonly called a tag.

In a cache with indexing, an item with a particular address can be placed only at the one place within the cache designated by the index. In addition, every item within the address space having identical index bits will potentially require the same line space within the cache. Therefore, a new line may be fetched that requires the same space in the cache as an existing line and the existing line may need to stay in the cache. This condition is called a conflict and is discussed in more detail below.

If a line can appear at only one place in the cache, the cache is said to be direct mapped (and is said to have low associativity). In an alternative design, a cache may be organized into sets, each set containing two or more lines. If a line can be placed in only one of the sets, the cache is said to be set associative. If a line can be placed anywhere in the cache, the cache is said to be fully associative. In general, caches having low associativity are simpler, faster and require less space than caches having high associativity. However, direct mapped or other low associativity caches may have performance problems due to conflicts as discussed below.

For a direct mapped cache or other low associativity cache, a new line may require the same space as an existing line. That is, instead of displacing lines randomly, or displacing the least recently used line, the new line displaces the line having the same index within the cache. The displaced line may be useful and may need to stay in the cache. A miss resulting from a useful line being displaced by a line having the same index is called a conflict miss. In some software, a second line may displace a first line, only to have the first line soon displace the second line. This thrashing of a single cache line can result in low system performance, even though the cache size is adequate for the particular software. There is need for the inherent speed and space advantages of low associativity caches while minimizing the negative effects on system performance due to conflict misses.

One approach to reducing the impact of conflict misses in direct mapped caches is to add a small fully associative secondary cache. For example, see Jouppi, N. P. "Improving Direct-Mapped Cache Performance by the Addition of a Small Fully-Associative Cache and Prefetch Buffers", *Proceedings of the 17th Annual International Symposium On Computer Architecture,* May 1990, pp 364–373 and see also U.S. Pat No. 5,261,066 (Jouppi et al). Jouppi proposes adding an additional small (2–5 lines) fully associative cache called a miss cache. In the event of a cache miss in the primary cache, the requested item is placed in both the primary cache and into the miss cache. Items placed in the miss cache replace the least recently used item. As an improvement, Jouppi proposes loading the small secondary cache with the displaced victim of a miss instead of the requested line, calling the resulting secondary cache a victim cache. In an alternative design, a small additional cache with first-in first-out replacement, called an assist cache, is disclosed in Kurpanek, G. et al, "PA7200: A PA-RISC Processor with Integrated High Performance MP Bus Interface", *Digest of Papers Spring COMPCON* 94, 1994, pp 373–382.

If there are multiple levels of caches, a lower level cache is typically larger than upper level caches and a lower level cache typically includes all the information that is in higher level caches. If the lower level cache includes all the information contained in higher level caches, the lower level cache is said to have inclusion. The primary advantage of inclusion is that when a check is needed to determine whether items in cache memory are the same as items elsewhere in the hierarchy (called coherency checking), only the lowest level cache needs to be checked. In general, for the systems with victim or assist caches described above, when an item is displaced from a lower level cache into the victim or assist cache, any corresponding item in a higher level cache is removed from the higher level cache. This impacts performance if the victim item is requested again, resulting in a cache miss for the higher level cache.

An alternative approach to reducing the impact of conflict misses in direct mapped caches is to monitor conflict miss address distribution and to remap memory paging. If the operating system has information on the cache conflict distribution it can remap pages that conflict with other pages into pages that have no such conflicts. This remapping can be static (determined before run time) or dynamic (changing based on conflict misses during software execution). The static approach assumes the operating system knows the number of pages mapped to a given cache line when deciding on the page's address translation (page mapping). For an example of the static approach, see Kessler, R. et al, "Page Placement Algorithms for Large Real-Indexed Caches", *ACM Transactions on Computer Systems,* Vol. 10, No. 4, Nov. 1992, pp 338–359. For an example of dynamic page remapping, see Bershad, B. et al, "Avoiding Conflict Misses Dynamically in Large Direct Mapped Caches", *ASLOS VI Proceedings,* Oct. 1994, pp 158–170. In Bershad et al, additional hardware is provided (called a Cache Miss Lookaside buffer) that detects and records a history of cache misses. Cache misses are detected on a per-page basis. Pages with many misses are remapped to different physical addresses. The Cache Miss Lookaside buffer stores associatively indexed page number tags from cache misses. The buffer also includes counters. If a cache miss is detected and the page number tag is already in the buffer the corresponding counter is incremented. If a cache miss is detected and the page number tag is not in the buffer, the least recently used address is displaced. When a counter exceeds a threshold, the buffer generates an interrupt and the operating system then remapps the page corresponding to the interrupting counter.

Victim caches and assist caches reduce conflict misses if the conflict misses occur within a relatively short time interval. For misses occurring at longer time intervals, the victim line may be displaced from the victim cache before it is required again by software. Dynamic page remapping reduces conflict misses but requires a relatively long time. The software context may change before remapping ever occurs. In addition, dynamic page remapping requires a large cache to provide many alternative target pages for remapping of high miss pages. Finally, in the specific implementation of Bershad et al, all cache misses are counted, even the ones that do not displace lines from the cache. There is a need for an improved cache system providing the speed and space benefits of a direct mapped cache, with reduction of short term effects of conflict misses as provided by small fully associative auxiliary caches, with the reduction of misses by dynamic page remapping and still other improvements.

SUMMARY OF THE INVENTION

The improved cache system (called a conflict cache) includes hardware for short term tolerance and reduction of cache misses and counters to help the operating system remove cache conflicts through dynamic page remapping. Providing both short term tolerance and long term removal is synergistic because once some conflict misses are removed through dynamic page remapping, other conflict misses further apart in time can then be detected, tolerated and eventually removed using the same process. In addition, combining a auxiliary cache and counters enables some hardware sharing. In one aspect of the invention, in systems with multiple levels of caching, the conflict cache is combined with an improved inclusion method for the top level cache to further reduce misses for the top level cache.

In an example embodiment, when a conflict miss occurs for a low associativity cache, the displaced item is moved to the conflict cache. The operating system views the low associativity cache as logically partitioned into bins, where the address range for a bin is a page or multiple pages. Every logical bin in the low associativity cache has a corresponding counter in the conflict cache. If an address misses in the low associativity cache but hits in the conflict cache, software reaccesses a line evicted from the low associativity cache due to a conflict. The corresponding bin counter is incremented for each of these conflict misses.

In an example embodiment having a multiple level cache hierarchy, the top level cache (L1 cache) is a subset of the union of a lower level low associativity cache (L2 cache) and the conflict cache. That is, lines removed from the lower level cache to the conflict cache are permitted to remain in the top level cache. This new inclusion property prolongs the life of cache lines in the top level cache in the presence of conflict misses, improving the top level cache performance. In addition, the top level cache (and the conflict cache) may contain several lines that map to the same index in the lower level cache, thereby reducing the probability of thrashing in the lower level cache.

The various aspects of the invention provide all the performance improvements of both victim caching and dynamic remapping plus additional performance improvements due to the synergistic operation of the two methods and the novel inclusion property in a multilevel cache hierarchy. The conflict cache counters provide better information to the operating system for dynamic remapping than previous dynamic remapping systems because only conflict misses are counted as opposed to counting all misses. In a multi-level cache hierarchy, the inclusion property of the conflict cache provides performance advantages relative to a victim cache because cache line victims are permitted to remain in the top level cache. In the example embodiment, a novel design reduces the hardware required for the combination of caching and counting functions by permitting both caching and counting to share a tag memory.

DETAILED DESCRIPTION OF THE PREFERRED EMBODIMENT OF THE INVENTION

Figure 1:
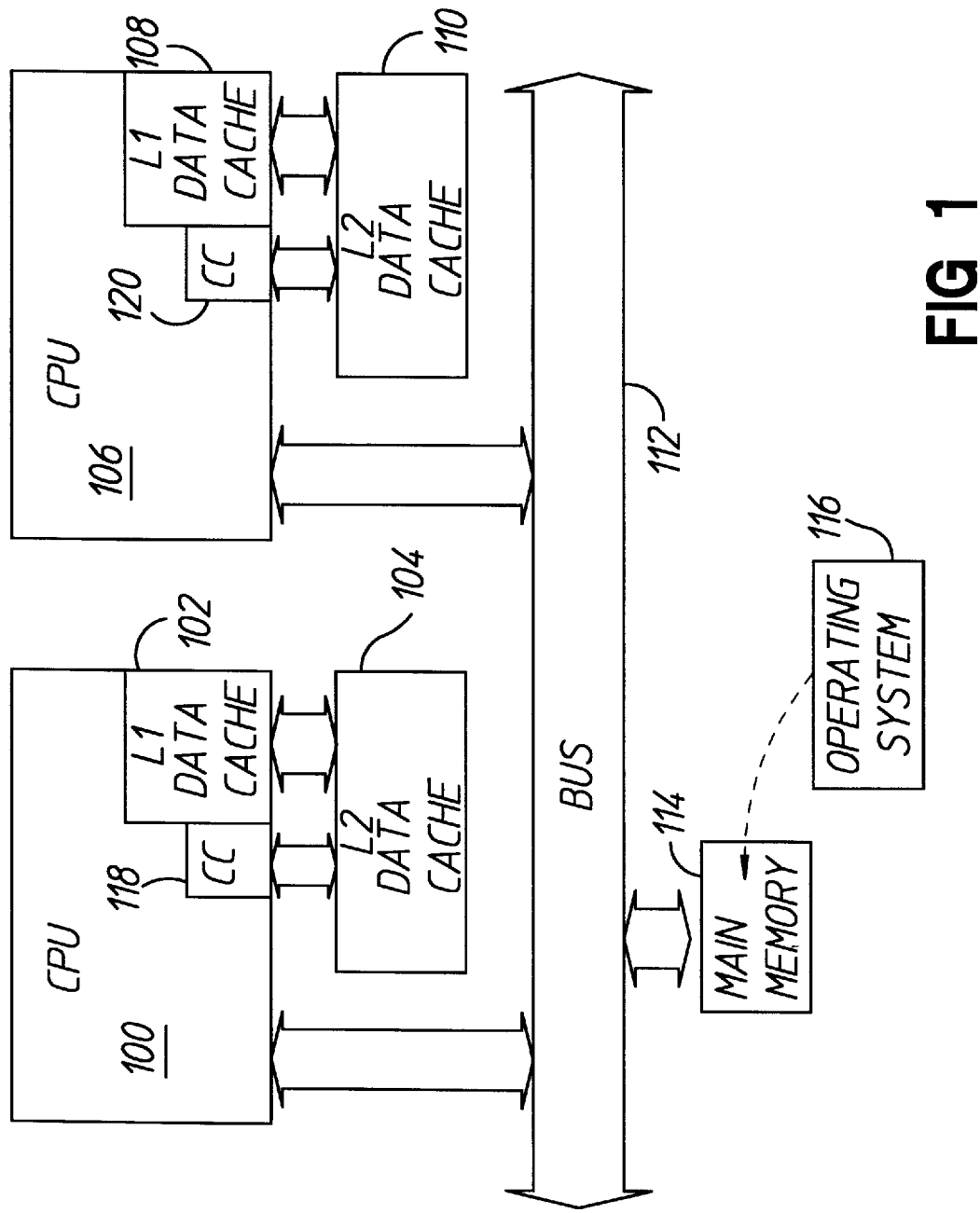
FIG. 1 is a block diagram schematic of a computer system including the invention.

FIG. 1 depicts an example computer system having a multiple-level cache memory hierarchy. In general, address and data bus structures for cache memory and main memory vary extensively in ways that are not relevant to the invention. In the example system of FIG. 1, a first central processing unit (CPU) 100 includes a first level data cache memory (L1 data cache) 102 integrated as part of the processor. A second level data cache (L2 data cache) 104 is depicted as implemented externally. CPU 100 may also include separate instruction caches (not illustrated). In FIG. 1, a second CPU 106 also contains a first level data cache 108 and a second level data cache 110. The two CPU's are connected by a bus 112. The two CPU's share one or more main memories 114. The system may also include a Translation Lookaside Buffer (TLB) (not illustrated) for translating virtual addresses to real addresses. Operating system software 116 resides in the main memory 114.

The invention includes a hardware structure called a conflict cache (118, 120). Conflict caches 118 and 120 are depicted in FIG. 1 as internal to the CPU's but they may be implemented externally. Whether or not any of the caches are internal or external to a processor is not important to the invention. Conflict caches may be used in conjunction with any low associativity cache to reduce conflict misses. To facilitate the discussion of inclusion, conflict caches 118 and 120 will be discussed in conjunction with the L2 caches (104, 110) but in general, the computer system may have only a single cache, or more than two levels of cache, and a conflict cache can provide performance improvements for any low associativity cache. In the following discussion, the L2 caches (104, 110) are assumed to be direct mapped. Therefore, the operating system 116 can improve conflict misses by careful page placement. Accordingly, the operating system 116 views the L2 caches 104 and 110 as being logically divided into bins, where a bin is a page of memory or multiple pages.

Figure 2:
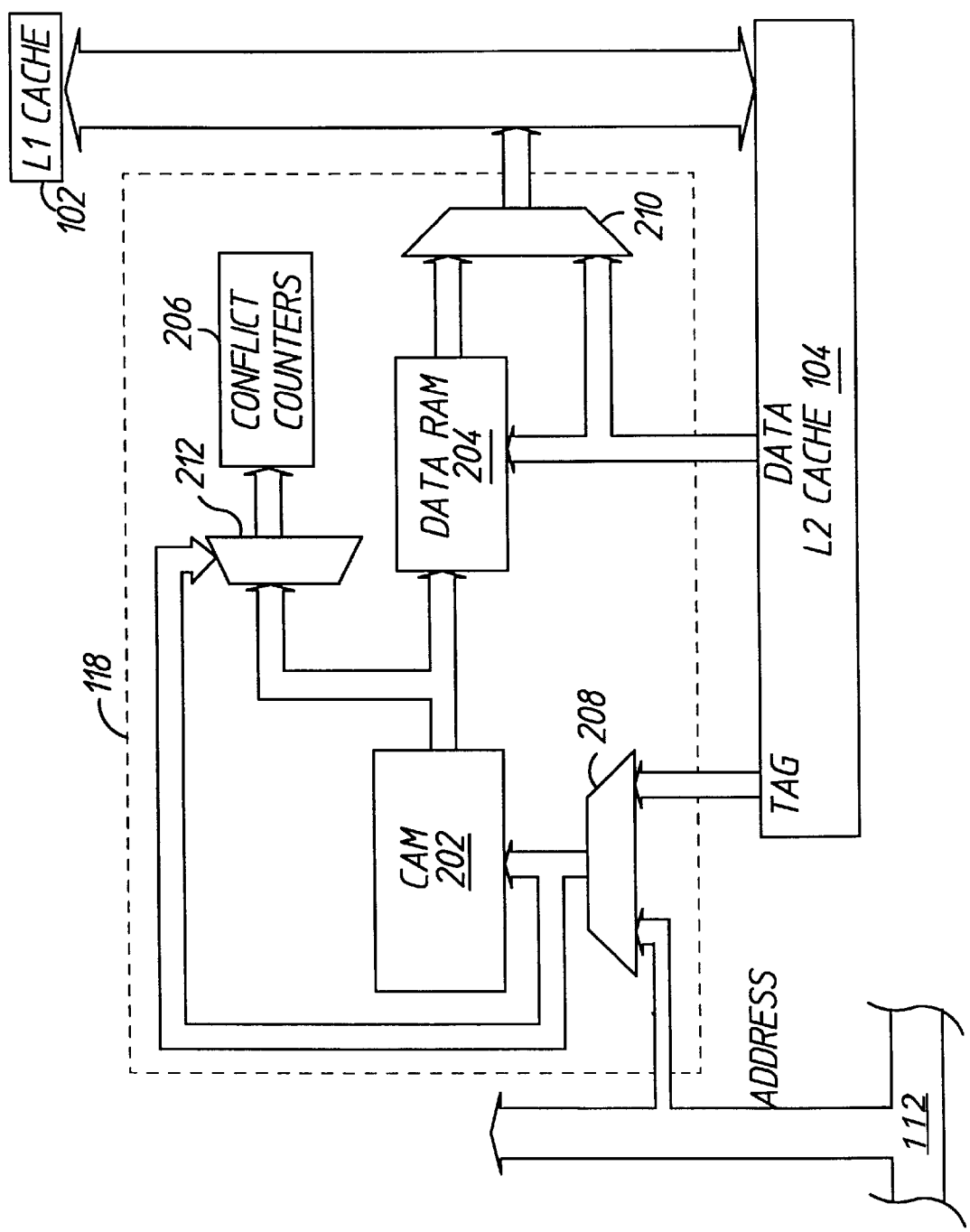
FIG. 2 is a block diagram schematic of additional detail for the invention and associated parts of the computer system.

FIG. 2 illustrates additional detail for the conflict cache 118. The conflict cache 118 comprises a content addressable memory (CAM) 202 to store address tags, a data RAM 204 to store lines of data, and conflict counters 206 to tally conflict misses. There is one counter in the conflict counters 206 for each logical bin in the L2 cache 104. In addition, there are digital multiplexers 208 and 210, and depending on the implementation perhaps a digital demultiplexer 212.

Figure 3:
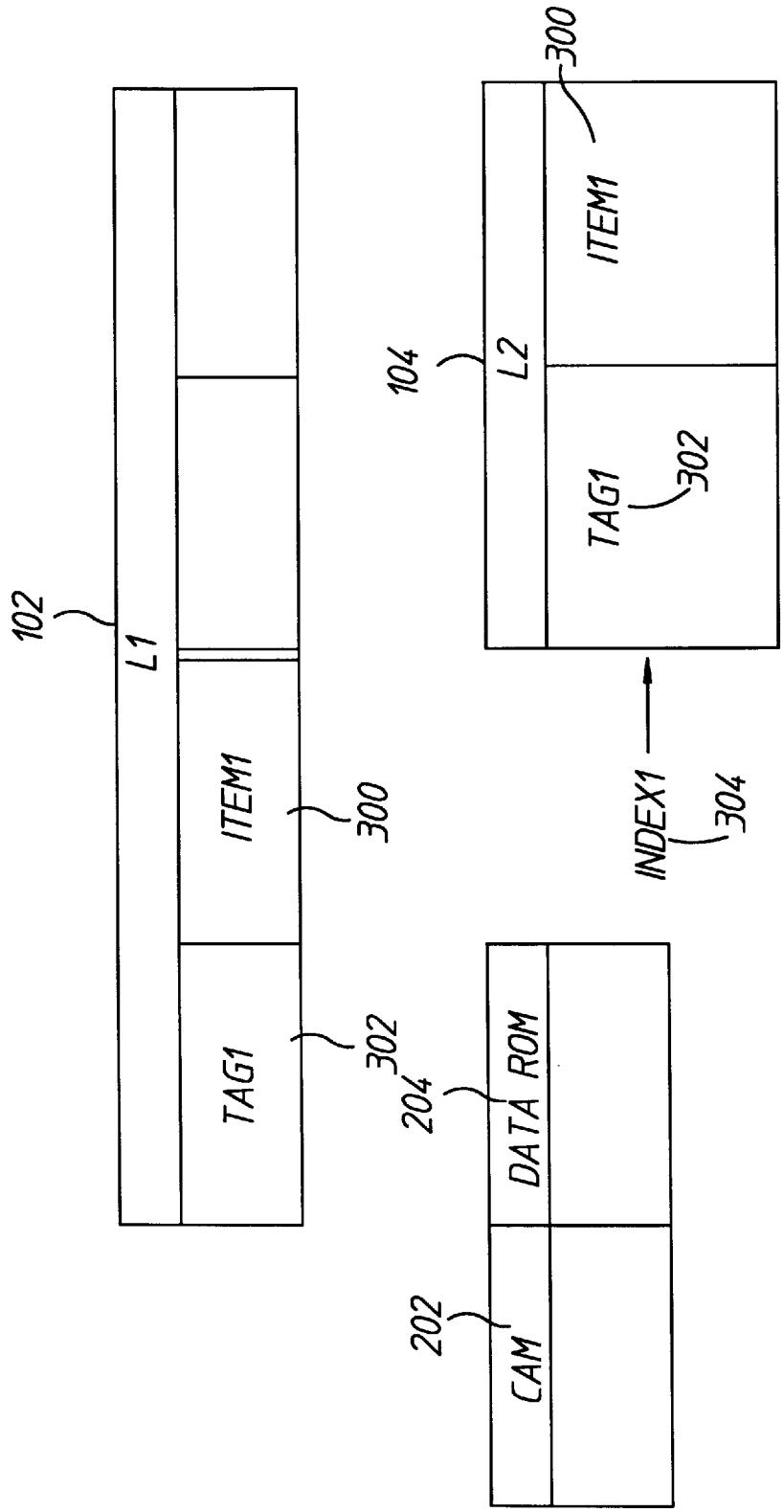
FIG. 3 is a block diagram of portions of FIGS. 1 and 2 illustrating location of data and addresses within the caches.

FIG. 3 illustrates the L1 cache 102, the L2 cache 104, the CAM 202 and data RAM 204 in the conflict cache, and an example data item ITEM1 (300) in the L1 cache 102. In FIGS. 3–6, the L1 cache 102 is depicted as a 2-way associative cache. This is for purposes of illustration only. The specific configuration of the L1 cache 102 is not important to the invention. ITEM1 (300) is also included in the L2 cache 104 along with its address tag TAG1 (302). The location of ITEM1 (300) in the L2 cache 104 is restricted to the location determined by the address index INDEX1 (304).

Figure 4:
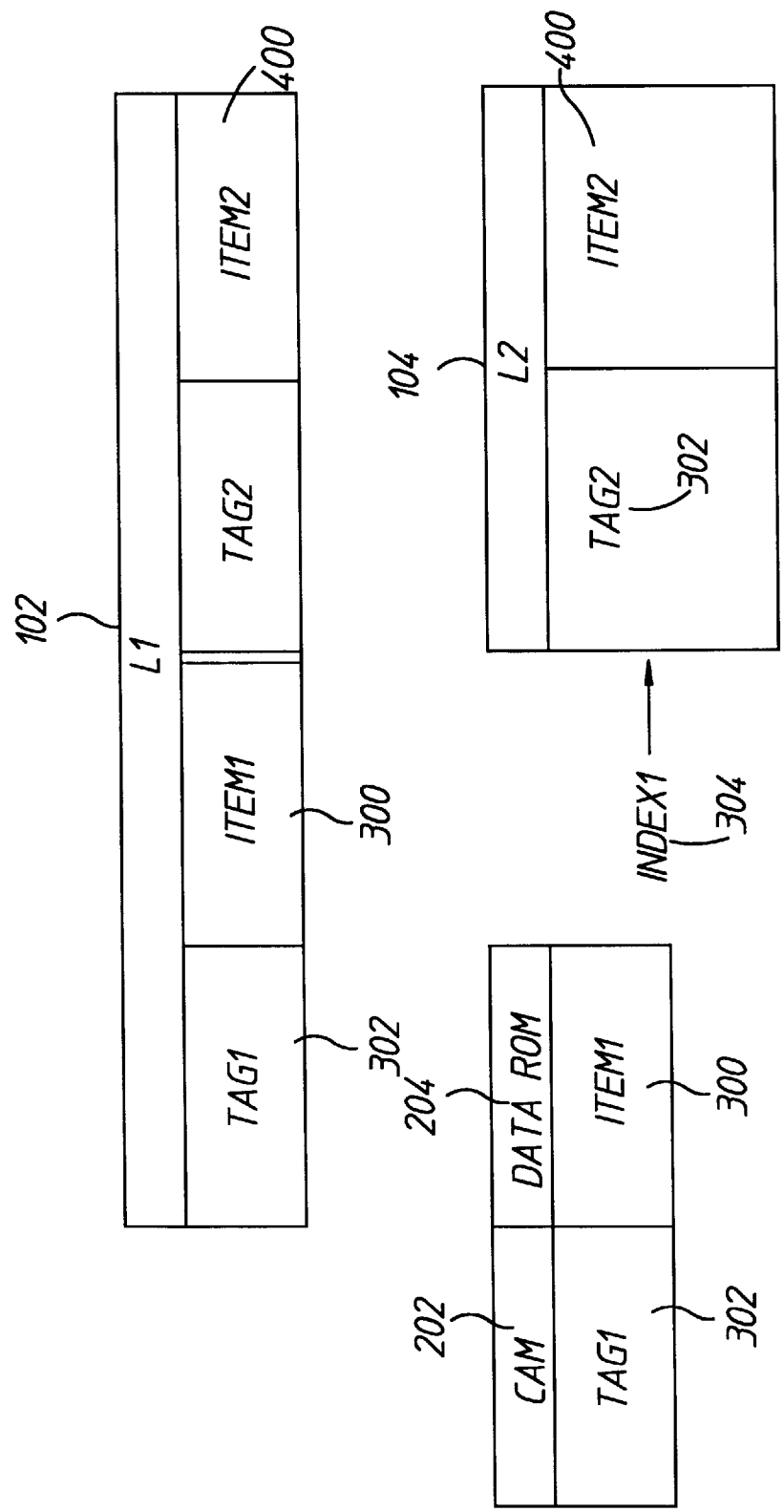
FIG. 4 is the block diagram of FIG. 3 illustrating locations of data after a conflict miss and illustrating the inclusion property of the invention.

FIG. 4 illustrates the same blocks of FIG. 3 after an item has been evicted from the L2 cache 104. When a line is evicted from the L2 cache 104, the address of the evicted line is stored in the CAM 202 and the data for the evicted line is stored in the data RAM 204. In FIG. 4, ITEM2 (400) is placed into the L1 cache 102 and into the L2 cache 104. ITEM2 (400) has the same index 304 as ITEM1 (300) and therefore must occupy the same location in the L2 cache 104. ITEM1 (300) has been displaced from the L2 cache 104 by ITEM2 (400) and placed into the conflict cache. Note that for coherency, in order to filter coherence checks going to the L1 cache 102, if ITEM1 (300) is modified in the L1 cache 102, it must also be modified in the conflict cache 118. Alternatively, coherence checks could check all three caches.

FIG. 4 (along with FIGS. 5 and 6) also illustrates the inclusion property of the invention. As discussed in the background section, in many systems with multi-level cache systems, each cache includes all lines of higher level caches. Typically, after a miss in a low level cache, a corresponding line in the top level cache is evicted. This typically results in a performance loss because typically the higher level cache is much faster than the lower level cache. Referring back to FIG. 4, for prior art systems, when ITEM2 (400) is inserted into the L2 cache 104 displacing ITEM1 (300), ITEM1 (300) in the L1 cache 102 would be removed because L2 would have to include all items in L1. In contrast, in the 2-level system illustrated in FIGS. 3–6, the L2 cache 104 does not include all the lines of the L1 cache 102. Instead, in accordance with one aspect of the invention, the union of the L2 cache 104 and the conflict cache (FIGS. 1 and 2, 118) includes all lines of the L1 cache 102. When a line is evicted from the L2 cache 104 to the conflict cache 118, the corresponding line (if present in the L1 cache 102) is left in the L1 cache 102 (if there is room to add a new line). Note in FIG. 4 that ITEM1 (300) is left in the L1 cache 102 even though ITEM1 (300) has been evicted from the L2 cache 104.

Figure 5:
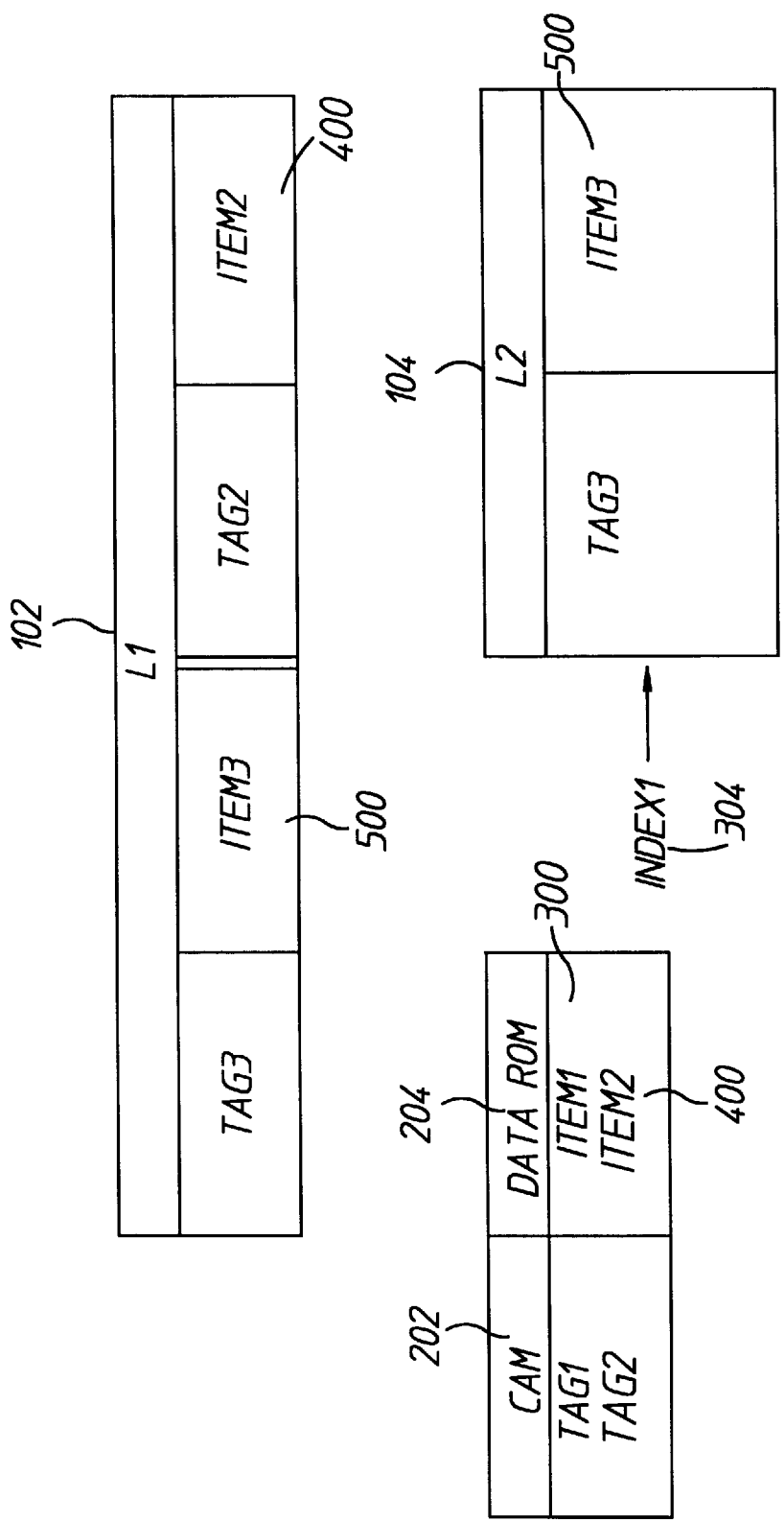
FIG. 5 is the block diagram of FIG. 4 illustrating locations of data after an additional conflict miss and further illustrating the inclusion property of the invention.

As illustrated in FIG. 5, a line may be evicted out of the L1 cache 102 to make room for a new line to be added. In FIG. 5, a new data item, ITEM3 (500) has been placed into the L1 cache 102 and into the L2 cache 104. ITEM3 (500) displaces ITEM2 (400) from the L2 cache 104 (same index) and displaces ITEM1 (300) from the L1 cache 102 (for example, displacement based on a determination of which line was least recently used). Note in FIG. 5 that even though ITEM2 (400) is displaced from the L2 cache 104, it is permitted to remain in the L1 cache 102.

Figure 6:
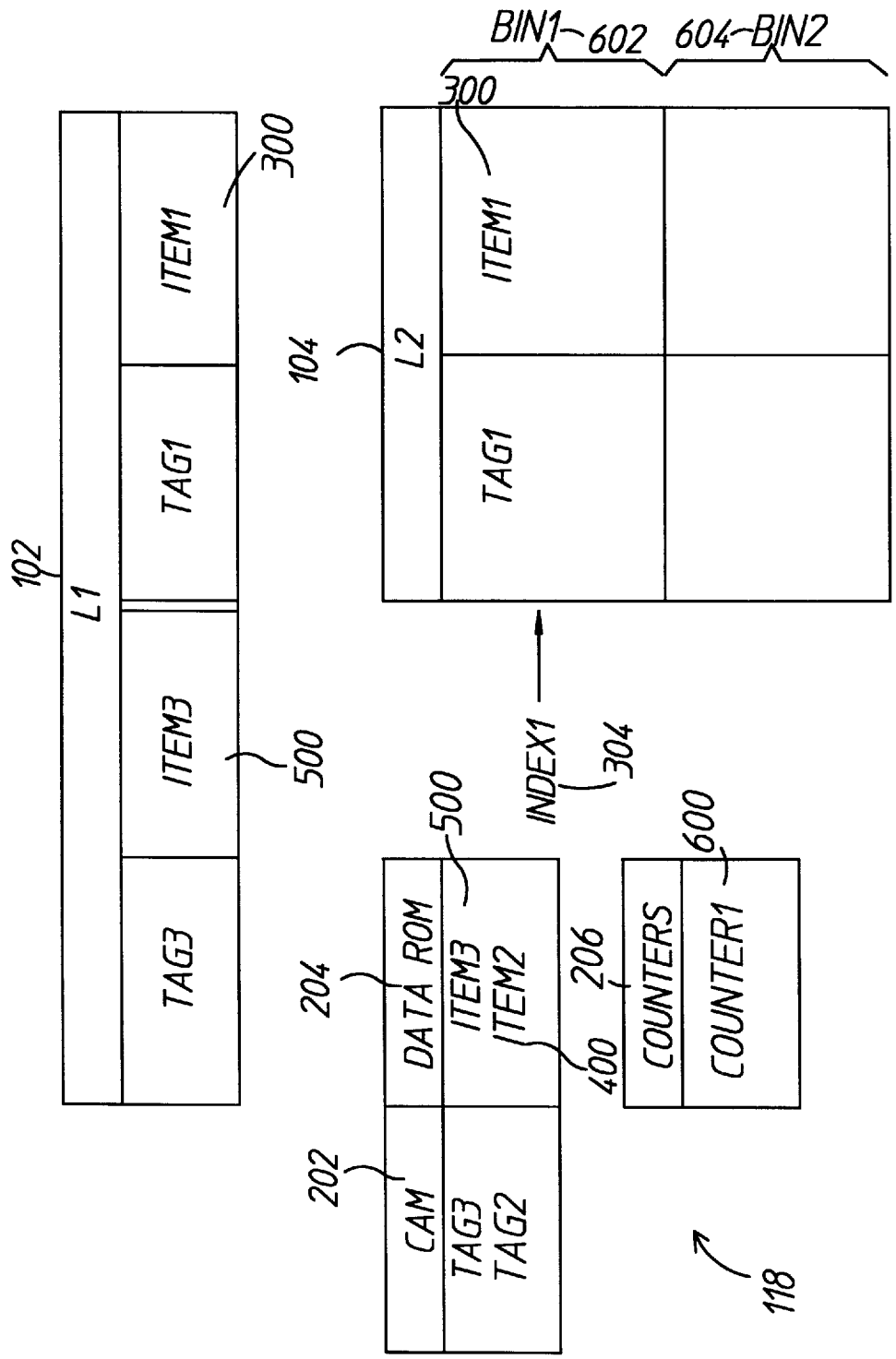
FIG. 6 is the block diagram of FIG. 5 illustrating locations of data after an additional conflict miss and illustrating the role of the conflict counters and logical bins.

As illustrated in FIG. 6, a line may be evicted out of the L1 cache 102 to make room for a line promoted from the conflict cache 118. Alternatively, a line may also be evicted out of the L1 cache 102 if the line is evicted out of the conflict cache 118 to make room for a new line displaced from the L2 cache 104. If there is a hit in the conflict cache 118, the line is promoted to the L1 cache 102 if it is cacheable in the L1 cache 102. Note in FIG. 6 that ITEM1 (300) is promoted to the L1 cache 102, displacing ITEM2 (400).

The inclusion approach of the invention as discussed above increases the life of some of the cache lines in the L1 cache 102 in the presence of conflict misses in the L2 cache 104, thereby improving the performance of the L1 cache 102. Note also that in FIGS. 5 and 6, the L1 cache 102 and the conflict cache 118 each contain at least two items that map to the same index in the L2 cache 104, thereby reducing the probability of thrashing in the L2 cache 104.

FIG. 6 also illustrates use of the counters 206 in the conflict cache 118 to aid in page remapping. FIG. 6 illustrates changes to the data locations of FIG. 5 following a subsequent processor request for ITEM1 (300). An address that misses in the L2 cache 104 is compared to addresses in CAM 202 in the conflict cache 118 to see if the requested line was previously evicted. Note in FIG. 5 that ITEM1 (300) is in the conflict cache 118, indicating a previous eviction from the L2 cache 104. If the requested line is in the conflict cache 118, the line is provided to the processor from the conflict cache via multiplexer 210 (FIG. 2). A Hit/Miss signal (not illustrated) is used to tell the processor (FIG. 1, 100) that a hit occurred. A miss in the L2 cache 104 that hits in the conflict cache 118 indicates that a conflict exists for that cache index (for that line) in the L2 cache 104. When a line misses in the L2 cache 104 but hits in the conflict cache 118, a corresponding conflict counter 206 is incremented, indicating a conflict for the particular logical cache bin in the L2 cache 104. Recall that the operating system (FIG. 1, 116) views the L2 cache 104 as being logically divided into bins, where a bin is a page of memory or multiple pages. In FIG. 6, the L2 cache 104 is divided by the operating system into multiple bins, including logical BIN1 (602). The page(s) in logical BIN1 (602) includes INDEX1 (304) for ITEM1 (400). In FIG. 6, COUNTER1 (600) corresponds to logical BIN1 (602). The conflict counter Hit/Miss signal (not illustrated) is used as an increment signal for the proper conflict counter 600 (using the demultiplexer 212 illustrated in FIG. 2). The contents of all the conflict counters 206 can be read by the operating system (FIG. 1, 116).

The conflict cache 118 is preferably dual ported or full line buffers are provided for simultaneous reads from and writes into the conflict cache. When an access misses the L2 cache 104, whatever line is present at the missed index in the L2 cache 104 is displaced to the conflict cache 118. Note in FIG. 6 that ITEM3 (500) is displaced from the L2 cache 104 to the conflict cache 118. If the L2 cache 104 misses and the conflict cache 118 hits (and the lines have different physical addresses), a line must be written to the conflict cache 118 from the L2 cache 104 and a line must be read from the conflict cache 118 to satisfy the access being performed. Note in FIG. 6 that one request from the processor results in ITEM1 (300) being moved from the conflict cache 118 to both the L1 cache 102 and the L2 cache 104 while ITEM2 (400) is moved from the L2 cache 104 to the conflict cache 118. Preferably, in order to optimize performance, one entry in the conflict cache 118 is reserved empty for a new L2 cache line so that the line can be moved into the conflict cache 118 without waiting for an old line to be flushed.

Note in FIGS. 3–6, to simplify illustration and discussion, address tags (for example TAG1 (302)) are depicted as identical (identical reference numbers) for each cache. In general, however, an address tag may be a different length for each of the caches. For example, TAG1 (302) is a subset of the bits comprising a full address for ITEM1 (300). The subset that is stored in the L2 cache 104 may be different than the subset stored in the L1 cache 102 or in the conflict cache 118. In general, each cache has different physical addressing requirements depending on the degree of associativity and other system requirements that are not relevant to the various aspects of the invention.

In a specific embodiment, the L2 cache 104 is implemented externally from commercially available SRAMs and the control circuitry is integrated as part of the processor 100. The conflict cache 118 is relatively small, for example, 8–32 cache lines. The conflict cache 118 can be accessed in parallel and with the same timing as the L2 cache 104.

As discussed in the background section above, fully associative buffers such as miss caches, victim caches and assist caches can improve conflict misses for a direct mapped cache, but only for conflict misses occurring within a relatively short period of time. Because of limited capacity, a victim line may be lost from the fully associative buffer before it is required again by software. Longer term conflict misses for a direct mapped cache may be removed by page remapping. Pages mapped to different cache bins cannot have conflict misses because by definition, different bins contain different index addresses. If the operating system has information on the cache conflict distribution, it can remove the "hot spots" by remapping pages that conflict into other cache bins that have no such conflicts. In the conflict cache 118, conflict counters are provided for dynamic remapping by the operating system.

In contrast to the counters disclosed in other systems that reduce conflict misses through dynamic page remapping, in which all cache misses are counted, the counters in the conflict cache 118 count only conflict misses, and in particular, only misses in the direct mapped L2 cache 104 that hit in the conflict cache 118. Providing both short term tolerance and long term removal of cache conflicts is synergistic because once some conflict misses are removed through dynamic page remapping, other conflict misses further apart in time can then be detected, tolerated and eventually removed using the same process. For example, in FIG. 6, L2 (104) misses for ITEM1 (300) are tolerated in the short term and if the counter 600 corresponding to BIN1 (602) for ITEM1 exceeds a predetermined threshold, the virtual memory page corresponding to ITEM1 will be swapped. In addition, in the design illustrated in FIG. 2, combining a secondary cache and counters enables sharing of hardware, for example the content addressable memory 202.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A cache system in a computer, the cache system comprising:
    a first cache, the first cache having an address space that is logically divided by an operating system into a plurality of bins, the first cache adapted to receive a request from a processor in the computer for a particular data item within a particular bin in the plurality of bins;
    a conflict cache electronically coupled to the first cache;
    a plurality of counters within the conflict cache, the plurality of counters having a one-to-one correspondence to the plurality of bins; and
    wherein a counter in the plurality of counters, corresponding to the particular bin, is incremented only when the request for the particular data item results in a cache miss for the first cache and a cache hit in the conflict cache.

2. The cache system of claim 1 further comprising:
    the first cache containing a conflict data item having an address that conflicts with an address of the particular data item; and
    wherein when the request for the particular data item results in a cache miss for the first cache, the conflict data item is evicted from the first cache and stored in the conflict cache.

3. The cache system of claim 2 further comprising:
    a higher cache, the higher cache and the first cache part of a memory hierarchy in which the higher cache is higher in the memory hierarchy than the first cache;
    the higher cache containing a copy of the conflict data item; and
    wherein when the request for the particular data item results in evicting the conflict data item from the first cache, the copy of the conflict data item is not evicted from the higher cache.

4. A cache system in a computer comprising:
    a higher cache;
    a lower cache, the higher cache and the lower cache part of a memory hierarchy in which the higher cache is higher in the memory hierarchy than the lower cache;

the higher cache and the lower cache each containing a copy of a conflict data item;

a conflict cache electronically coupled to the lower cache and adapted to store the conflict data item when a conflict miss in the lower cache results in eviction of the conflict data item; and wherein when a conflict miss results in an eviction of the conflict data item from the lower cache to the conflict cache, the conflict data item is not evicted from the higher cache.

5. A method for reducing cache misses in a cache memory system, the method comprising the following steps:

receiving, by a first cache and by a conflict cache, from a processor, a request for a data item;

incrementing a counter, by the conflict cache, only when the data item has an address within a particular logical memory bin and the request for the data item results in a cache miss in the first cache and in a cache hit in the conflict cache; and remapping a page within the particular logical memory bin, by an operating system, when the counter exceeds a predetermined value.

6. A method of inclusion for a computer cache system, comprising the following steps:

receiving, by a lower cache and by a higher cache, the higher cache higher in a memory hierarchy than the lower cache, from a processor, a request for a particular data item, the lower cache and the higher cache each containing a copy of a conflict data item that conflicts with the particular data item;

evicting the conflict data item, by the lower cache, from the lower cache to a conflict cache; and permitting, by the higher cache, the conflict data item to remain in the higher cache.

* * * * *

UNITED STATES PATENT AND TRADEMARK OFFICE
CERTIFICATE OF CORRECTION

PATENT NO. : 5,860,095
DATED : January 12, 1999
INVENTOR(S) : Sorin Iacobovici et al.

It is certified that error appears in the above-identified patent and that said Letters Patent is hereby corrected as shown below:

<u>Title page,</u>
Item [54], delete "MISCOUNTERS" and insert therefor -- MISSCOUNTERS --.

Signed and Sealed this

Seventeenth Day of September, 2002

Attest:

JAMES E. ROGAN
Attesting Officer   Director of the United States Patent and Trademark Office